(12) United States Patent
Sutterfield et al.

(10) Patent No.: US 10,451,003 B2
(45) Date of Patent: Oct. 22, 2019

(54) NOZZLE SUPPORT SYSTEM

(71) Applicant: Rolls-Royce North American Technologies, Inc., Indianapolis, IN (US)

(72) Inventors: David L. Sutterfield, Greenwood, IN (US); Randall E. Yount, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 753 days.

(21) Appl. No.: 14/923,669

(22) Filed: Oct. 27, 2015

(65) Prior Publication Data

US 2016/0115904 A1    Apr. 28, 2016

Related U.S. Application Data

(60) Provisional application No. 62/069,593, filed on Oct. 28, 2014.

(51) Int. Cl.
*F02K 1/80* (2006.01)
*F02C 7/20* (2006.01)
(Continued)

(52) U.S. Cl.
CPC ............... *F02K 1/78* (2013.01); *F01D 9/041* (2013.01); *F01D 9/042* (2013.01); *F01D 25/16* (2013.01); *F01D 25/246* (2013.01); *F01D 25/28* (2013.01); *F02C 3/04* (2013.01); *F02C 7/20* (2013.01); *F02C 7/28* (2013.01); *F16B 1/00* (2013.01); *F16M 11/06* (2013.01); *F16M 11/2007* (2013.01); *F16M 13/02* (2013.01); *F02K 1/80* (2013.01); *F05D 2220/323* (2013.01);
(Continued)

(58) Field of Classification Search
CPC ... F02K 1/80; F02K 1/805; F02K 1/36; F02K 1/04; F02C 7/20; F01D 25/24–30; F01D 25/162; F01D 25/164; F01D 9/04; F01D 9/041
See application file for complete search history.

(56) References Cited

U.S. PATENT DOCUMENTS 2,928,648 A    3/1960  Haines
2,938,336 A    5/1960  Peterson
(Continued)

FOREIGN PATENT DOCUMENTS

EP    1149986 A2    10/2001
GB    749577 A      5/1956

OTHER PUBLICATIONS

Neo Nickel, "Alloy C263", material properties.*
(Continued)

*Primary Examiner* — Gerald L Sung
*Assistant Examiner* — Rene D Ford
(74) *Attorney, Agent, or Firm* — Fishman Stewart PLLc

(57) ABSTRACT

A nozzle support system for a nozzle of a gas turbine includes an outer ring, an inner ring disposed within the outer ring, and a plurality of links pivotally attaching the outer ring to the inner ring. Each one of the links may have an outer end that is pivotally attached to the outer ring, and each one of the links may have an inner end that is pivotally attached to the inner ring, such that the inner ring moves along a longitudinal axis of the outer ring.

18 Claims, 3 Drawing Sheets

(51) Int. Cl.
  *F01D 25/30* (2006.01)
  *F02K 1/78* (2006.01)
  *F02C 3/04* (2006.01)
  *F01D 9/04* (2006.01)
  *F16M 13/02* (2006.01)
  *F16M 11/06* (2006.01)
  *F16M 11/20* (2006.01)
  *F16B 1/00* (2006.01)
  *F01D 25/16* (2006.01)
  *F01D 25/24* (2006.01)
  *F01D 25/28* (2006.01)
  *F02C 7/28* (2006.01)

(52) U.S. Cl.
  CPC .. *F05D 2240/35* (2013.01); *F16B 2001/0078* (2013.01); *Y02T 50/672* (2013.01)

(56) References Cited

U.S. PATENT DOCUMENTS

| | | | |
|---|---|---|---|
| 3,002,341 A | 10/1961 | Muzzy et al. | |
| 3,261,587 A * | 7/1966 | Rowley | F01D 25/164 415/138 |
| 3,372,874 A | 3/1968 | Colville et al. | |
| 3,403,889 A * | 10/1968 | Ciokajlo | F01D 25/162 415/118 |
| 3,807,639 A | 4/1974 | Soligny et al. | |
| 4,720,901 A | 1/1988 | Johnson et al. | |
| 4,979,872 A | 12/1990 | Myers et al. | |
| 6,792,748 B2 | 9/2004 | de Verduzan et al. | |
| 7,464,536 B2 | 12/2008 | Renggli et al. | |
| 8,015,820 B2 | 9/2011 | Harris et al. | |
| 9,062,565 B2 * | 6/2015 | Mahan | F01D 21/045 415/191 |
| 2004/0253096 A1 * | 12/2004 | Legg | F01D 9/04 415/191 |
| 2015/0377073 A1 * | 12/2015 | Suciu | F01D 25/162 60/805 |

OTHER PUBLICATIONS

Neo Nickel, "Alloy 718", material properties.*
Agilent Technologies, "Laser and Optics Users Manual", aluminum thermal expansion properties.*
Serach Report dated May 9, 2016 for EP15191706.9.

* cited by examiner

NOZZLE SUPPORT SYSTEM

CROSS-REFERENCE TO RELATED APPLICATION

This application claims priority to U.S. Provisional Patent Application No. 62/069,593 filed Oct. 28, 2014, the contents of which are hereby incorporated in its entirety.

GOVERNMENT LICENSE RIGHTS

This disclosure was made with government support under Contract Number N00014-04-D-0068 awarded by Defense Advanced Research Projects Agency (DARPA). The government has certain rights in the disclosure.

FIELD OF TECHNOLOGY

The present disclosure relates to gas turbine engines, and more particularly to a nozzle support system configured to decrease internal loads within the support system during operation of the gas turbine, thus increasing the service life of the system and requiring less repair of the same.

BACKGROUND

Current gas turbine manufacturers produce nozzle support assemblies having stiff frames for supporting center bodies disposed behind the turbines in gas turbines. In particular, these frames typically include inner and outer rings connected to each other by a series of vanes that are brazed or welded to one or both rings. The fixed connection point between each vane and the rings provide stress risers that can carry a moment when the vane receives a load. Furthermore, vanes that are brazed or welded to both rings can have additional internal loads corresponding with differential thermal growth of the outer ring, the inner ring and the vanes. Thus, the combination of the internal pressure loads and differential thermal load can move the center body aft, which in turn opens a sealing arrangement between the components of the engine thus permitting cooling air to escape and reducing the ability to provide load control.

It would therefore be helpful to provide a nozzle support system that decreases the internal pressure loads and the differential thermal load of the nozzle to maintain a seal interface with the turbine and thus permit load control of the gas turbine.

BRIEF DESCRIPTION OF THE DRAWINGS

For purposes of promoting an understanding of the principles of the disclosure, reference will now be made to the examples illustrated in the drawings, and specific language will be used to describe the same. It will nonetheless be understood that no limitation of the scope of the disclosure is intended by the illustration and description of certain examples of the disclosure. In addition, any alterations and/or modifications of the illustrated and/or described examples are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure. The description herein makes reference to the accompanying drawings wherein like reference numerals refer to like parts throughout the several views, and wherein.

DETAILED DESCRIPTION

Figure 1:
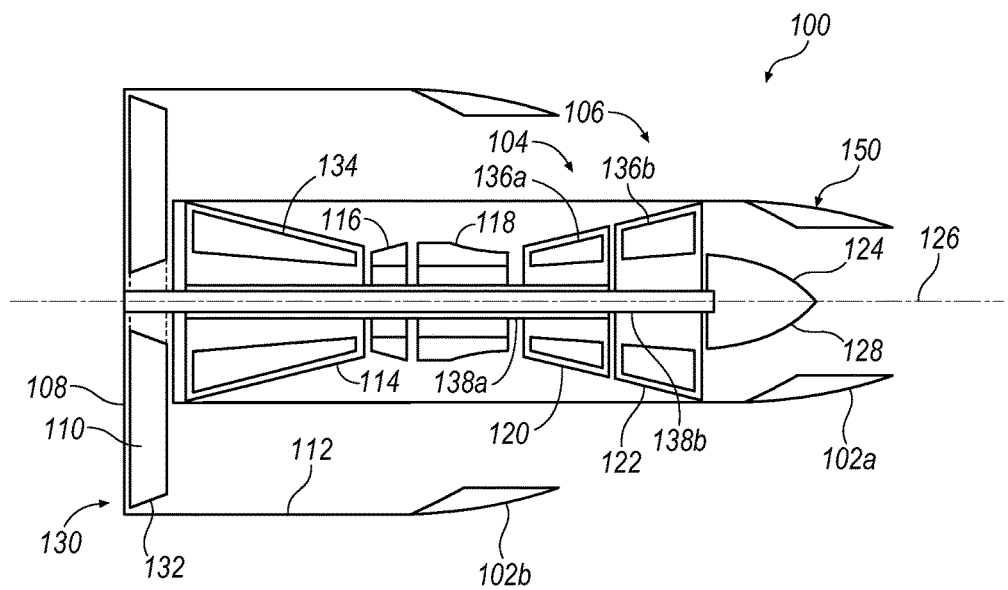
FIG. 1 schematically illustrates some aspects of one non-limiting example of a gas turbine engine including a nozzle that has a nozzle support system configured to decrease internal loads of the nozzle, in accordance with one embodiment of the present disclosure.
Figure 4:
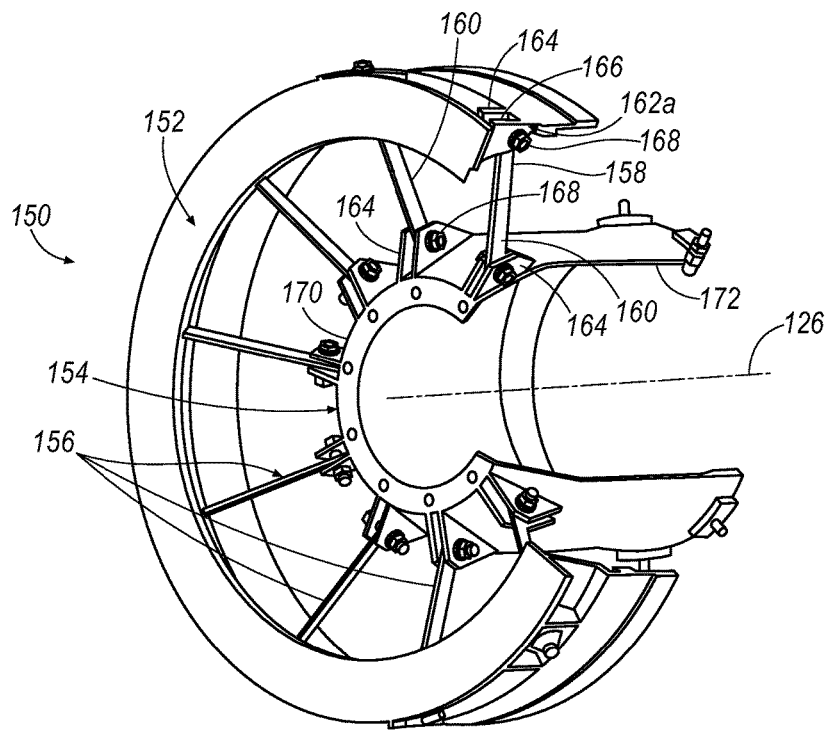
FIG. 4 is a perspective view of the nozzle support system of FIG. 2.

Referring to the drawings, and in particular FIG. 1, there are illustrated some aspects of a non-limiting example of a gas turbine engine including a nozzle, which in turn has a nozzle support system configured to reduce internal stresses of the nozzle, and thus, for example, permit the nozzle to include a center body and other components made of metal, ceramic, composites, ceramic matrix composites and various other materials. More specifically, as best shown in FIG. 4, the nozzle support system includes an outer ring, an inner ring disposed within the outer ring, and a plurality of links pivotally attaching the outer ring to the inner ring. Each one of the links has an outer end that is pivotally attached to the outer ring, and each one of the links has an inner end that is pivotally attached to the inner ring, such that the inner ring moves along a longitudinal axis of the outer ring, thus, for example, adjusting for differential thermal growth of various portions of the nozzle and reducing other internal stresses therein.

In one form, engine 100 is a propulsion engine, e.g., an aircraft propulsion engine. In other examples, engine 100 may be any other type of gas turbine engine, e.g., a marine gas turbine engine, an industrial or power generation gas turbine engine, or any aero, aero-derivative or non-aero derivative gas turbine engine. The engine 100 may be a two spool engine having a high pressure (HP) spool (rotor) 104 and a low pressure (LP) spool (rotor) 106.

In other examples, engine 100 may include only a single spool, or may include three or more spools, e.g., may include an intermediate pressure (IP) spool and/or other spools and/or partial spools, e.g., on-axis or off-axis compressor and/or turbine stages (i.e., stages that rotate about an axis that is the same or different than that of the primary spool(s)). In one form, engine 100 is a turbofan engine. In other examples, engine 100 may be any other type of gas turbine engine, such as a turboprop engine, a turboshaft engine, a propfan engine, a turbojet engine or a hybrid or combined cycle engine. As a turbofan engine, LP spool 106 is operative to drive a propulsor 108 in the form of a turbofan (fan) system, which may be referred to as a turbofan, a fan or a fan system. As a turboprop engine, LP spool 106 powers a propulsor 108 in the form of a propeller system (not shown), e.g., via a reduction gearbox (not shown). As a propfan engine, LP spool 106 powers a propulsor 108 in the form of a propfan. In other examples, propulsor 108 may take other forms, such as one or more helicopter rotors or tilt-wing aircraft rotors, for example, powered by one or more engines 100 in the form of one or more turboshaft engines.

Figure 2:
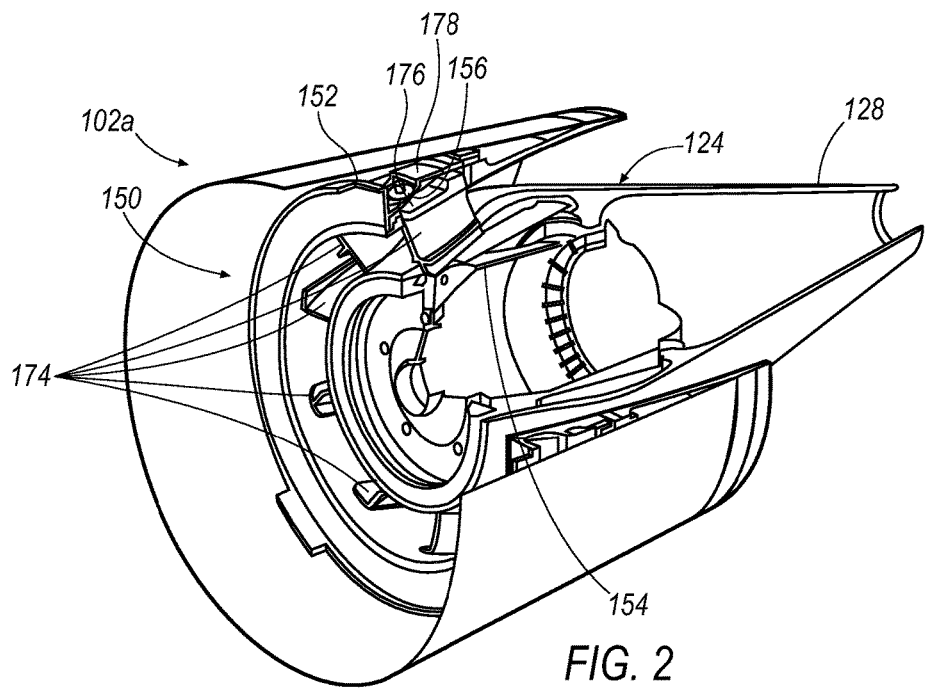
FIG. 2 is a partially cutaway perspective view of the nozzle of FIG. 1.

According to one example, engine 100 includes, in addition to fan 110, a bypass duct 112, a compressor 114, a diffuser 116, a combustor 118, a high pressure (HP) turbine 120, a low pressure (LP) turbine 122, a nozzle 102a, and a nozzle 102b, which are generally disposed about and/or rotate about an engine centerline 126. As shown in FIG. 2, the nozzle 102a includes the center body 124, the outer support structure 178 and the nozzle support system 150, which supports the center body 124 and the outer support structure 178. In this non-limiting example, the center body 124 is a tail cone 128, which defines an inner diameter of an annular flow path configured to pass the exhaust gas therethrough. The nozzle support system 150 urges the tail cone 128 toward the turbine 122 to hold a front end portion of the tail cone 128 in a sealing position such that the tail cone 128 remains engaged to a seal interface system 180 (FIG. 3) when components of the nozzle support system 150 thermally expands during operation of the engine 100.

Furthermore, in other non-limiting examples, there may be an intermediate pressure spool having an intermediate pressure turbine or other turbomachinery components, such as those mentioned above. In one form, engine centerline 126 is the axis of rotation of fan 110, compressor 114, turbine 120 and turbine 122. In other examples, one or more of fan 110, compressor 114, turbine 120 and turbine 122 may rotate about a different axis of rotation.

In the example illustrated in FIG. 1, engine 100 core flow is discharged through nozzle 102a, and the bypass flow from fan 110 is discharged through nozzle 102b. In other examples, other nozzle arrangements may be employed, e.g., a common nozzle for core and bypass flow; a nozzle for core flow, but no nozzle for bypass flow; or another nozzle arrangement. Bypass duct 112 and compressor 114 are in fluid communication with fan 110. Nozzle 102b is in fluid communication with bypass duct 112. Diffuser 116 is in fluid communication with compressor 114. Combustor 118 is fluidly disposed between compressor 114 and turbine 120. Turbine 122 is fluidly disposed between turbine 120 and nozzle 102a. The combustor 118 may include a combustion liner (not shown) that contains a continuous combustion process. Alternatively, combustor 118 may take other forms, and may be, for example, a wave rotor combustion system, a rotary valve combustion system, a pulse detonation combustion system, a continuous detonation combustion system and/or a slinger combustion system, and may employ deflagration and/or detonation combustion processes.

Fan system 130 includes a fan rotor system 132 driven by LP spool 106. In various examples, fan rotor system 132 may include one or more rotors (not shown) that are powered by turbine 122. In various examples, fan 110 may include one or more fan vane stages (not shown) that cooperate with fan blades (not shown) of fan rotor system 132 to compress air and to generate a thrust-producing flow. Bypass duct 112 is operative to transmit a bypass flow generated by fan 110 around the core of engine 100. Compressor 114 may include a compressor rotor system 134. In various examples, compressor rotor system 134 includes one or more rotors (not shown) that are powered by turbine 120. Compressor 114 also includes a plurality of compressor vane stages (not shown in FIG. 1) that cooperate with compressor blades (not shown) of compressor rotor system 134 to compress air. In various examples, the compressor vane stages may include a compressor discharge vane stage and/or one or more diffuser vane stages. In one form, the compressor vane stages are stationary. In other examples, one or more vane stages may be replaced with one or more counter-rotating blade stages.

Turbine 120 includes a turbine rotor system 136a. In various examples, turbine rotor system 136a includes one or more rotors having turbine blades (not shown) operative to extract power from the hot gases flowing through turbine 120 (not shown), to drive compressor rotor system 134. Turbine 120 also includes a plurality of turbine vane stages (not shown) that cooperate with the turbine blades of turbine rotor system 136a to extract power from the hot gases discharged by combustor 118. In one form, the turbine vane stages are stationary. In other examples, one or more vane stages may be replaced with one or more counter-rotating blade stages. Turbine rotor system 136a is drivingly coupled to compressor rotor system 134 via a shafting system 138a. Turbine 122 includes a turbine rotor system 136b. In various examples, turbine rotor system 136b includes one or more rotors having turbine blades (not shown) operative to drive fan rotor system 132. Turbine 120 also includes a plurality of turbine vane stages (not shown) that cooperate with the turbine blades of turbine rotor system 136b to extract power from the hot gases discharged by turbine 120. In one form, the turbine vane stages are stationary. In other examples, one or more vane stages may be replaced with one or more counter-rotating blade stages. Turbine rotor system 136b is drivingly coupled to fan rotor system 132 via a shafting system 138b. In various examples, shafting systems 138a and 138b include a plurality of shafts that may rotate at the same or different speeds and directions for driving fan rotor system 132 rotor(s) and compressor rotor system 134 rotor(s). In some examples, only a single shaft may be employed in one or both of shafting systems 138a and 138b. Turbine 122 is operative to discharge the engine 100 core flow to nozzle 102a.

During normal operation of gas turbine engine 100, air is drawn into the inlet of fan 110 and pressurized. Some of the air pressurized by fan 110 is directed into compressor 114 as core flow, and some of the pressurized air is directed into bypass duct 112 as bypass flow. Compressor 114 further pressurizes the portion of the air received therein from fan 110, which is then discharged into diffuser 116. Diffuser 116 reduces the velocity of the pressurized air, and directs the diffused core airflow into combustor 118, which is configured to generate a high temperature exhaust gas. In particular, fuel is mixed with the pressurized air in combustor 118, which is then combusted. The hot gases exiting combustor 118 are directed into turbines 120 and 122, which extract energy in the form of mechanical shaft power to drive compressor 114 and fan 110 via respective shafting systems 138a and 138b. The hot gases exiting turbine 122 are discharged through the nozzle 102a disposed downstream of the combustor 118, and thus provide a component of the thrust output by engine 100.

Turning now to FIG. 2, there is illustrated an enlarged partially cutaway view of the exemplary nozzle 102a of FIG. 1 including the nozzle support system 150 configured to reduce internal pressure loads and differential thermal loads when hot gases pass through the nozzle 102a. In particular, the exemplary nozzle support system 150 may include an outer ring 152 and an inner ring 154. In this example, the inner ring 154 has a smaller radius $R_I$ than the radius $R_O$ of the outer ring 152, and this inner ring 154 is disposed concentrically within the outer ring 152.

Figure 3:
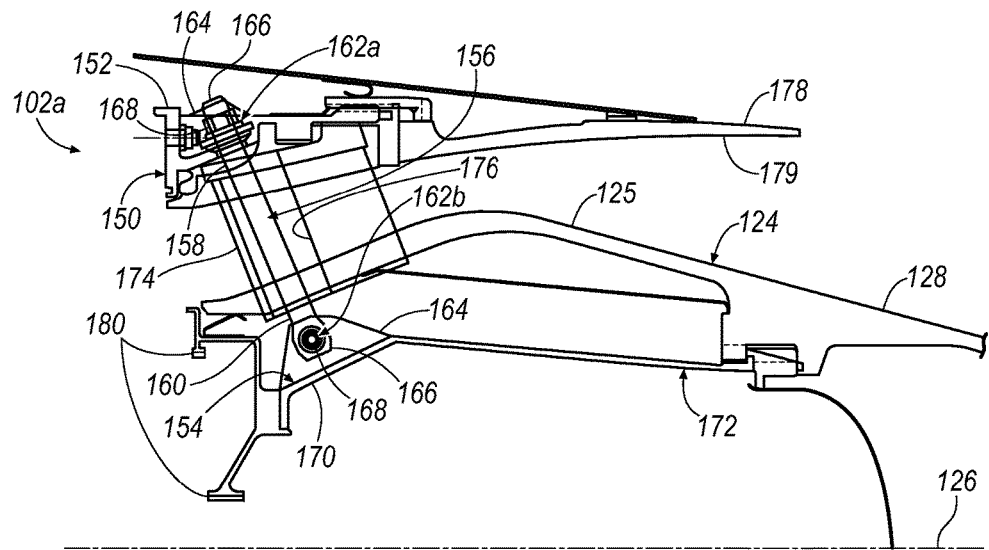
FIG. 3 is a side cross-sectional view of the nozzle of FIG. 2.
Figure 5:
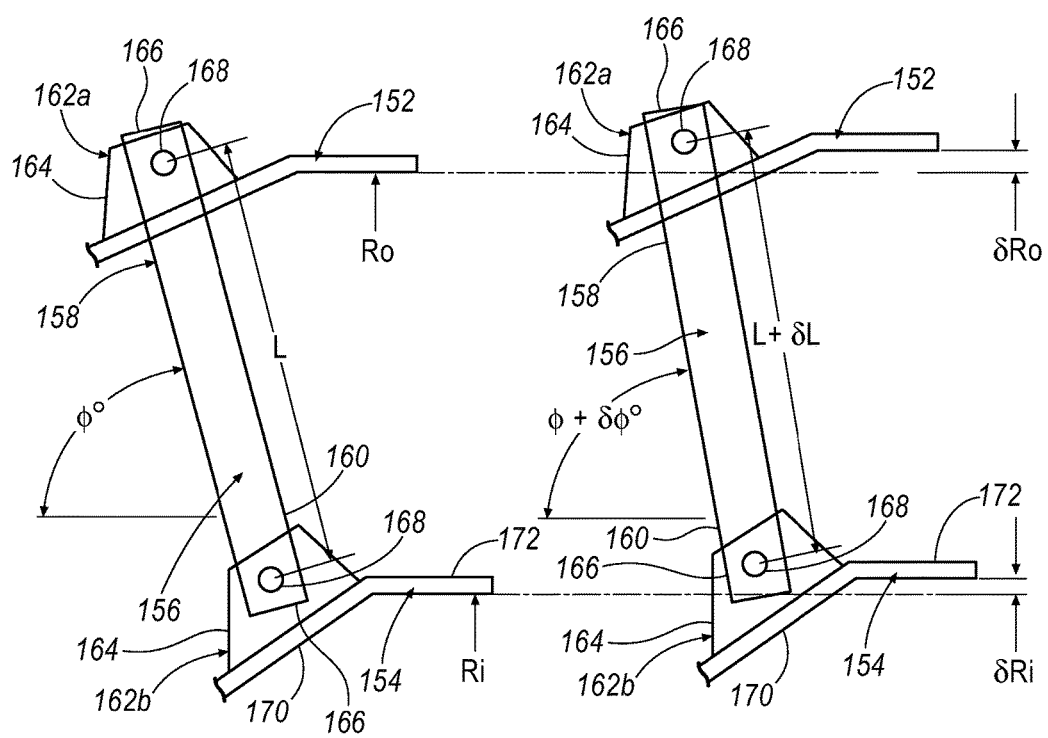
FIG. 5 is an enlarged side view of a portion of the nozzle support system of FIG. 4, in a first position and a second position corresponding with the system thermally expanding.

Turning now to FIGS. 3 through 5, the support system 150 further includes a plurality of links 156, which are spaced apart from one another about the circumference of the inner ring 154, and the links 156 pivotally attach the outer ring 152 to the inner ring 154. The pivoting attachment of the links 156 is configured to transfer only compressive and tensile loads between the outer ring 152 and the inner ring 154. This arrangement can reduce or eliminate bending moments within the nozzle 102a. Furthermore, this decrease of internal loads can permit the center body 124 to be made of ceramic, a composite, a ceramic matrix composite, other materials or any suitable combination thereof without decreasing the service life of the center body 124 or increasing the frequency of repairing the same. More specifically, each one of the links 156 can have an outer end 158 that is pivotally attached to the outer ring 152, and each one of the links 156 can have an inner end 160 that is pivotally attached to the inner ring 154, such that the inner ring 154 moves with respect to the outer ring 152 along a longitudinal axis 126 of the outer ring 152. As best shown in FIGS. 4 and 5, the exemplary support system 150 may include a plurality of pin fasteners 162a configured to pivotally attach a respective one of the outer ends 158 of the links 156 to the outer ring 152, and the support system 150 may further include a plurality of pin fasteners 162b configured to pivotally attach a respective one of the inner ends 160 of the links 156 to the inner ring 154. Each pin fastener 162a, 162b can include a clevis 164 extending from the respective rings 152, 154, a tang 166 extending from the link 156, and a clevis pin 168 attaching the tang 166 to the clevis 164. However, the support system may include other suitable pivoting fasteners, including for example, hemispherical bearings elements. Moreover, in this form, the inner ring 154 is an annular surface portion 170 of a front end portion of a generally cylindrical body 172, which is configured to carry the tail cone 128. However, the inner ring 154 can be an annular surface portion of a body having various non-cylindrical shapes.

In this form, the nozzle 102a may further include a plurality of vanes 174 (FIGS. 2 and 3) extending along a radial direction between the inner and outer rings 152, 154, and each one of the vanes 174 may define a passage 176 (FIG. 3) that has a respective one of the links 156 disposed therein. Moreover, the nozzle 102a further includes the center body 124, which is attached to the inner ring 154, and the outer support structure 178, which is attached to the outer ring 152. As best shown in FIG. 3, the center body 124 supports a hot inner flow path liner 125, and the outer support structure 178 supports a hot outer flow path liner 179. Both liners 125, 179 are supported so that thermal loads are minimal thereby permitting the use of non-traditional materials. Exemplary materials may include, but are not limited to, ablative materials, metals, ceramics, composites, carbon-carbon, metal matrix composites, inter-metallic matrix composites and refractory materials.

Turning to FIG. 3, this exemplary nozzle 102 further includes a seal 180, which is disposed forward of the center body 124. This seal 180 is configured to engage the turbine rotor 136a or 136b (FIG. 1) to maintain a flow path through the engine 100 and maintain control of the corresponding engine load. In particular, the inner ring 154 may be configured to hold the seals 180 relative to the turbine rotor 136a or 136b or carry the center body 124 in a desired direction with respect to the outer ring 152 along the longitudinal axis 126, when the rings 152, 154 and the links 156 thermally expand. More specifically, as shown in FIG. 5, the outer ring 152, the inner ring 154, the links 156 or any suitable combination thereof have coefficients of thermal expansion configured to hold or urge the center body 124, which in turn holds or urges the seals 180, in a forward direction along the longitudinal axis 126, when the engine 100 is operating and producing hot gases. To that end, the coefficient of thermal expansion of the outer ring 152 may be greater than the coefficient of thermal expansion of the inner ring 154. In addition, the coefficient of thermal expansion of the outer ring 152 may be greater than the coefficient of thermal expansion of the links 156. In this non-limiting exemplary embodiment, the outer ring 152, inner ring 154 and the links 156 are made of materials, which are selected for their coefficients of thermal expansion. Furthermore, these components are configured to define the geometry of the support system 150 in such a way so as to control the movement of the seals 180 relative to the turbine 136. However, these materials are still capable of operation at temperatures and loads defined by their environment. In other non-limiting exemplary embodiments, the components may have other configurations and be made of materials having other coefficients of thermal expansion to open a gap between the center body and the turbine and, thus for example provide a desired cooling flow during operation.

The disclosed system is not limited to an aerospace or aircraft gas turbines. In one example, such as a power generation system, the gas turbine may be used to actuate a generator for producing electricity. As such, this disclosure provides a nozzle support system for decreasing internal loads of any suitable nozzle. That is, the nozzle support system can include multiple components that are pivotally attached to one another, so as to permit movement of those components relative to one another as each component thermally expands pursuant to its respective coefficient of thermal expansion during operation of the gas turbine. The use of alternating hemi-spherical washers with threaded link ends and mating nuts can remove the tolerance in the clevis-link-pin interfaces so that the support system does not rattle or chatter during vibratory loading With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A nozzle support system for a gas turbine, comprising:
an outer ring;
an inner ring disposed within the outer ring;
a plurality of links pivotally attaching the outer ring to the inner ring; and
a plurality of vanes extending along a radial direction between the inner and outer rings, each one of the vanes having a radially inner end at a different axial location than a radially outer end of the respective vane, and each one of the vanes defining a passage that has a respective one of the links disposed therein;
wherein each one of the links has an outer end that is pivotally attached to the outer ring, and each one of the links has an inner end that is pivotally attached to the inner ring, such that the inner ring moves along a longitudinal axis of the outer ring; and wherein the outer end of each link is pivotally attached to the outer ring at a different axial location than where the inner end of each link is pivotally attached to the inner ring such that the link forms an acute angle with the longitudinal axis.

2. The nozzle support system of claim 1, wherein the coefficient of thermal expansion of the outer ring is greater than the coefficient of thermal expansion of the inner ring.

3. The nozzle support system of claim 2, wherein the coefficient of thermal expansion of the outer ring is greater than the coefficient of thermal expansion of the plurality of links.

4. The nozzle support system of claim 3, wherein the inner ring is configured to carry a center body in a forward direction with respect to the outer ring along the longitudinal axis of the outer ring, in response to a thermal expansion of the nozzle support system.

5. The nozzle support system of claim 1, wherein the inner ring is a conical front end portion of a cylindrical body configured to carry a tail cone.

6. The nozzle support system of claim 1, wherein the links are spaced apart from one another about the circumference of the inner ring.

7. The nozzle support system of claim 1, further comprising a plurality of pin fasteners configured to pivotally attach a respective one of the outer ends of the links to the outer ring.

8. The nozzle support system of claim 1, further comprising a plurality of pin fasteners configured to pivotally attach a respective one of the inner ends of the links to the inner ring.

9. A nozzle, comprising:
a nozzle support system having an outer ring, an inner ring disposed within the outer ring, and a plurality of links pivotally attaching the outer ring to the inner ring;
an outer support structure attached to the outer ring;
a center body attached to the inner ring and defining an inner diameter of a flow path configured to pass an exhaust gas; and
a plurality of vanes extending along a radial direction between the inner and outer rings, each one of the vanes having a radially inner end at a different axial location than a radially outer end of the respective vane, and each one of the vanes defining a passage that has a respective one of the links disposed therein;
wherein each one of the links has an outer end that is pivotally attached to the outer ring, and each one of the links has an inner end is pivotally attached to the inner ring, such that the inner ring moves along a longitudinal axis of the outer ring; and
wherein the outer end of each link is pivotally attached to the outer ring at a different axial location than where the inner end of each link is pivotally attached to the inner ring such that the link forms an acute angle with the longitudinal axis.

10. The nozzle of claim 9, further comprising a seal, and at least one of the outer ring, the inner ring and the links has a coefficient of thermal expansion configured to urge the center body against the seal in response to thermal expansion of the nozzle support system.

11. The nozzle of claim 9, wherein the coefficient of thermal expansion of the outer ring is greater than the coefficient of thermal expansion of the inner ring.

12. The nozzle of claim 11, wherein the coefficient of thermal expansion of the outer ring is greater than the coefficient of thermal expansion of the plurality of links.

13. The nozzle of claim 12, wherein the center body is made of at least one of a metallic, a ceramic, a composite, and a ceramic matrix composite material.

14. The nozzle of claim 9, wherein the inner ring is configured to carry the center body in a forward direction with respect to the outer ring along the longitudinal axis of the outer ring, in response to thermal expansion of the nozzle support system.

15. The nozzle of claim 9, further comprising a plurality of pin fasteners configured to pivotally attach a respective one of the outer ends of the links to the outer ring.

16. The nozzle of claim 9, further comprising a plurality of pin fasteners configured to pivotally attach a respective one of the inner ends of the links to the inner ring.

17. A gas turbine, comprising:
a combustor configured to generate an exhaust gas;
a nozzle disposed downstream of the combustor; and
a plurality of vanes extending along a radial direction between the inner and outer rings, each one of the vanes having a radially inner end at a different axial location than a radially outer end of the respective vane, and each one of the vanes defining a passage that has a respective one of the links disposed therein;
wherein the nozzle includes a nozzle support system having an outer ring, an inner ring and a plurality of links pivotally attaching the outer ring to the inner ring;
wherein the nozzle further includes an outer support structure attached to the outer ring;
wherein the nozzle further includes a center body attached to the inner ring and defining an inner diameter of an annular flow path configured to pass the exhaust gas therethrough;
wherein each one of the links has an outer end that is pivotally attached to the outer ring, and each one of the links has an inner end that is pivotally attached to the inner ring, such that the inner ring moves along a longitudinal axis of the outer ring; and
wherein the outer end of each link is pivotally attached to the outer ring at a different axial location than where the inner end of each link is pivotally attached to the inner ring such that the link forms an acute angle with the longitudinal axis.

18. The gas turbine of claim 17, further comprising a seal, and at least one of the outer ring, the inner ring and the links has a coefficient of thermal expansion configured to urge the center body in a direction, which in turn urges the seal one of toward and away from a turbine, in response to the nozzle support system receiving heat.

* * * * *